(No Model.)
A. C. RICH.
MACHINE FOR TREATING FEATHERS.
No. 351,654. Patented Oct. 26, 1886.
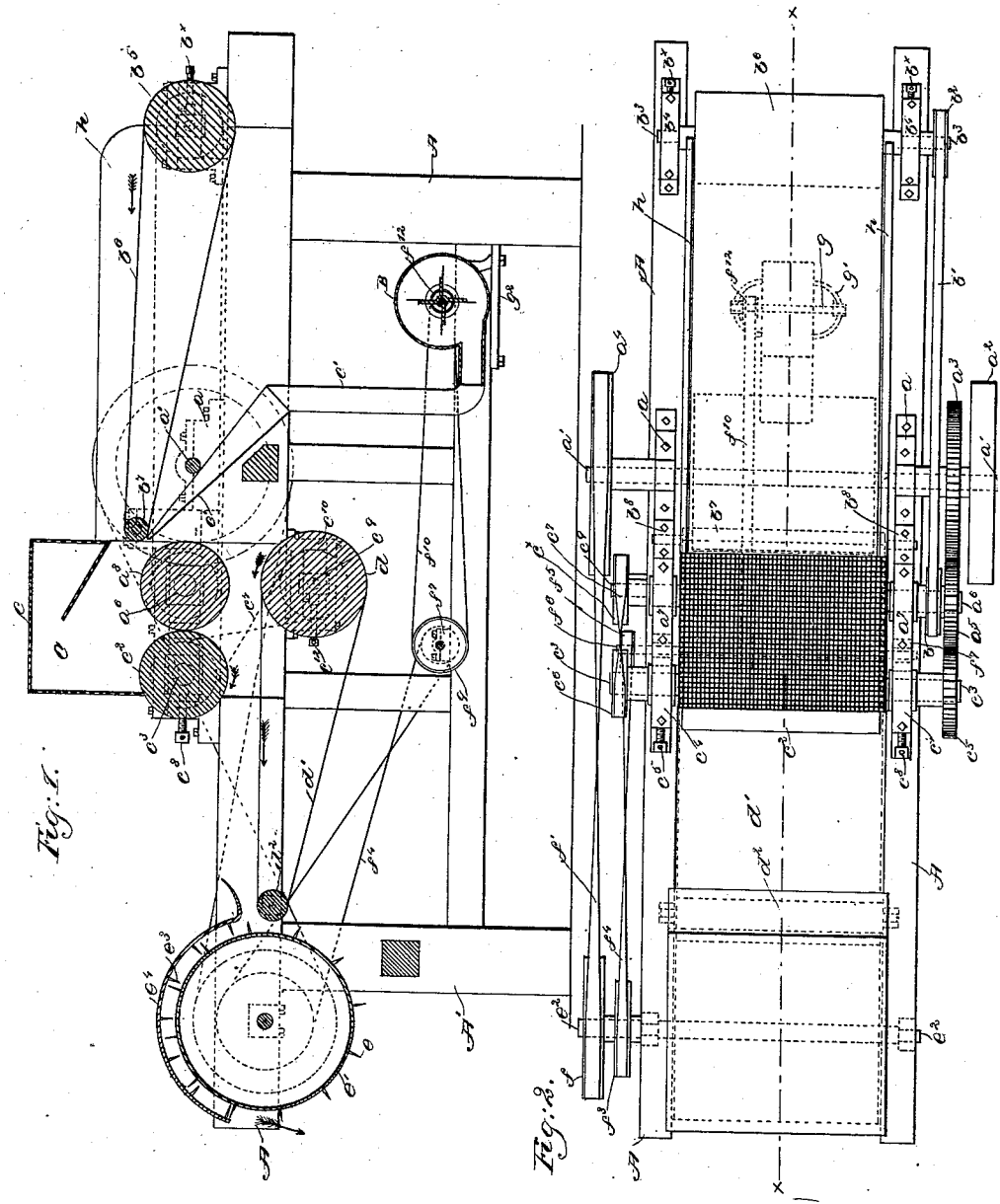

UNITED STATES PATENT OFFICE.

ARTHUR C. RICH, OF SOMERVILLE, MASSACHUSETTS.

MACHINE FOR TREATING FEATHERS.

SPECIFICATION forming part of Letters Patent No. 351,654, dated October 26, 1886.

Application filed May 12, 1886. Serial No. 201,958. (No model.)

*To all whom it may concern:*

Be it known that I, ARTHUR C. RICH, of Somerville, county of Middlesex, and State of Massachusetts, have invented an Improvement in Machines for Treating Feathers, of which the following description, in connection with the accompanying drawings, is a specification, like letters on the drawings representing like parts.

This invention has for its object to provide an apparatus for the treatment of feathers, whereby coarse feathers of an inferior quality may be rendered soft and pliable, to serve the purpose of feathers of superior quality.

The finer better qualities of geese-feathers are expensive, and to render inferior or coarse feathers serviceable as substitutes, I have ascertained that they may be softened and made pliable by subjecting them to a crushing pressure and a partial disintegration. To do this I have provided an apparatus in which the said coarse feathers are rendered free from dirt and crushed, and thereafter broken up, the said feathers passing from the apparatus much softened, and suitable for purposes for which the finer grades of feathers have been used hitherto.

My invention consists, essentially, in an endless belt or apron, upon which the feathers are deposited, one or more pairs of rollers or cylinders to crush the feathers carried forward by said rollers, a receptacle or chamber located above said crushing-rollers, a blower to free the feathers from dust and force them into said chamber or receptacle, combined with an endless belt to receive the feathers from the crushing-rollers, substantially as will be described.

Other features of my invention will be pointed out in the claims at the end of this specification.

Figure 1 is a vertical section of my improved apparatus for treating feathers, the section being taken on line $x\,x$, Fig. 2; Fig. 2, a plan or top view of Fig. 1.

The frame-work A of the apparatus is of suitable shape to support the bearings, &c., of the working parts. It has boxes $a$ for the main shaft $a'$, provided at one end with a driving-pulley, $a^2$, and a gear, $a^3$, and at its other end with a belt-pulley, $a^4$. The gear $a^3$ meshes with a gear, $a^5$, on a shaft, $a^6$, having its journals supported in boxes $a^7$, supported on the framework, the shaft $a^6$ having mounted on it a crushing cylinder or roller, $a^8$, extended across the frame-work, the said cylinder having co-operating with it a second crushing-cylinder, $c^2$, on a shaft, $c^3$, having a gear, $c^5$, driven by the gear $a^5$. The shaft $a^6$ has a pulley, $b$, (see Fig. 2,) which has passed over it a belt, $b'$, which also passes around a pulley, $b^2$, on a shaft, $b^3$, supported in bearings $b^4$ near one end of the apparatus, and made adjustable thereon by screws $b^\times$, the shaft $b^3$ being revolved by the belt $b'$. The shaft $b^3$ has mounted on it a cylinder or roller, $b^5$, around which passes an endless feed apron or belt, $b^6$, said apron or belt being preferably of a width to fill the space between the side boards, $h$, attached to the frame-work, the feed-apron passing over a smaller roller or cylinder, $b^7$, near the center of the machine, said cylinder $b^7$ being supported in journal-bearing $b^8$. The endless belt or apron $b^6$ forms a carrier, upon which the coarse feathers are deposited.

The coarse feathers, as they are about to drop from the apron or belt $b^6$, are blown into a receptacle or chamber, C, inclosed by suitable foraminous material, $c$, by a blast of air issuing from a spout, $c'$, connected to a fan-blower, B. The fan of said blower being revolved in a manner, as will be described, permits the dust and small foreign particles in the feathers to be blown away, but the heavier particles of foreign matter contained in the feathers, such as stones or nails, drop from the belt or apron $b^6$ to the floor or into a suitable receptacle located below the roller $b^7$. The feathers blown into the receptacle or chamber C descend by gravity and are caught between the crushing-cylinders $a^8$ and $c^2$, the journals or boxes supporting the shaft of the cylinder $c^2$ being adjustable by means of screws $c^8$ to thus vary the extent of crushing-pressure.

The shaft $c^3$ has at one end a pulley, $c^6$, connected by a belt, $c^7$, with a pulley, $c^\times$, on a shaft, $c^9$, the shaft $c^9$ having its journals supported in bearings $c^{10}$, (see dotted lines, Fig. 1,) made adjustable by screw $c^{12}$. The shaft $c^9$ has mounted on it a cylinder or roller, $d$, over which passes a secondary endless belt or feeding apron, $d'$, said belt or apron also passing over a small roller or cylinder, $d^2$. The belt or apron $d'$ receives the feathers from the crushing-rollers, the quills or stock of said feathers being crushed and rendered pliable and soft. The belt $c^7$, connecting the pulley $c^6$ on the shaft $c^3$ with the pulley $c^x$ on the shaft $c^9$, is crossed, to give reverse motions to said shafts and thereby to the cylinders $c^2$ and $d$, so that as the feathers drop from between the crushing-rollers they will be carried forward by the secondary belt or feeding-apron $d'$ in the direction indicated by arrow in Fig. 1.

The feathers in a bruised or crushed condition are taken from the belt or apron $d'$ by teeth $e$ of a toothed cylinder or drum, $e'$, on a shaft, $e^2$, supported in bearings in the sides A. The teeth $e$ are somewhat separated from each other, to permit a tooth, $e^3$, on a semi cylindrical cover or shell, $e^4$, secured to the frame A, to be passed between the teeth $e$ as the drum or cylinder $e'$ is revolved, thereby disintegrating more or less the stock or quills of the feathers. The cylinder or drum $e'$ is revolved by a pulley, $f$, on the shaft $e^2$, said pulley being connected by a belt, $f'$, with the pulley $a^4$ on the main shaft $a'$, said belt being crossed to impart reverse motions to the said pulleys. The shaft $e^2$ also has a second pulley, $f^3$, connected by a belt with a pulley, $f^5$, on a shaft, $f^6$, having journals in bearings $f^7$, supported by the frame-work, the belt $f^4$ being crossed to give a motion to the shaft $f^6$ reverse to that of the shaft $e^2$.

The shaft $f^6$, near its center, has mounted on it a pulley, $f^9$, connected by a belt, $f^{10}$, with a pulley, $f^{12}$, (see dotted lines, Fig. 2,) on the shaft $g$ of the fan-blower B, of any usual construction, said shaft having bearings in the frame-work $g'$ of the blower supported in suitable manner.

In operation, the gear $a^3$ on the main shaft, which is driven in any usual manner, rotates the gear $a^5$ on the shaft $a^6$, which latter gear drives the gear $c^5$ on the shaft $c^3$. The pulley $b$ on the shaft $a^6$ drives the pulley $b^2$ through the belt $b'$, the rotation of the shaft $b^3$ causing the endless feeding-apron $b^6$ to be moved in the direction of arrow, Fig. 1, to carry forward the feathers deposited on said apron by hand or otherwise. The crushing rollers or cylinders $a^8$ and $c^2$ on the shafts $a^6 c^3$, respectively, crush the feathers and deposit them on the secondary feeding-belt $d'$, which is driven by the belt $c^7$, connecting the pulley $c^6$ on the shaft $c^3$ of the cylinder or roller $c^2$ with the pulley $c^x$ on the shaft $c^9$ of the cylinder or roller $d$. The toothed drum or cylinder $e'$, which takes the feathers in a crushed condition from the apron or belt $d'$, is revolved by the belt $f'$, connecting the pulley $a^4$ on the main shaft $a'$ with the pulley $f$ on the shaft $e^2$. The fan of the blower B, by which a blast of air is forced through the pipe $c'$ to blow the feathers into the chamber or receptacle C, and thereby free said feathers from dust, dirt, and foreign matter, is rotated by the belt $f^{10}$, connecting the pulley $f^{12}$ on the blower-shaft $g$ with the pulley $f^9$ on the shaft $f^6$, the latter shaft being itself rotated by the belt $f^4$, connecting the pulley $f^5$ on the shaft $f^6$, with the pulley $f^3$ on the shaft $e^2$. The feathers acted upon by the teeth $e$ $e^3$ fall into a suitable receptacle, and, disintegrated and softened, the feathers are in condition to be employed for many purposes to which the finer quality of feathers have been heretofore used.

It is evident that instead of the system of belts and pulleys shown and described, I may employ a system of shafts and toothed gearing.

Prior to my invention I am aware feathers have been prepared for bedding in an apparatus consisting of an endless belt to feed the feathers to a picker, a guide to receive the feathers from the picker, a second endless belt to carry the feathers from the guide to fluted or corrugated rolls, and a fan to blow the feathers upon the said second endless belt as they fall from the said guide, such apparatus being herein disclaimed.

I claim—

1. In a machine for treating feathers, an endless belt or apron upon which the feathers are deposited, one or more pairs of rollers or cylinders to crush the feathers carried forward by said belts, a receptacle or chamber located above said crushing-rollers, a blower to free the feathers from dust and force them into said chamber or receptacle, combined with an endless belt to receive the feathers from the crushing-rollers, substantially as described.

2. In a machine for treating feathers, an endless feeding apron or belt upon which the feathers are deposited, crushing rollers or cylinders to crush the feathers carried forward by said endless apron or belt, a second endless belt or apron to receive the feathers from the crushing rollers or cylinders, a revolving drum or cylinder having teeth, a shell or cover located above the said revolving drum or cylinder and provided with teeth to co-operate with the teeth of the said revolving cylinder, combined with means, substantially as described, to impart rotation to the different parts of the apparatus, as and for the purpose set forth.

3. In a machine for treating feathers, an endless feeding apron or belt upon which the feathers are deposited, crushing rollers or cylinders, a revolving drum or cylinder having teeth, a stationary semi-cylindrical shell or cover located above the said revolving drum or cylinder and provided with teeth to co-operate with the teeth of the said revolving cylinder, combined with means, substantially as described, to impart rotation to the different parts of the apparatus, as and for the purpose set forth.

4. In a machine for treating feathers, an endless belt or apron upon which the feathers are deposited, one or more pairs of rollers or cylinders to crush the feathers carried forward by said belt, a receptacle or chamber located above said crushing-rollers, a blower to free the feathers from dust and force them into said chamber or receptacle, combined with an endless belt to receive the feathers from the crushing-rollers, and with means, substantially as described, to operate the parts of the apparatus, as and for the purpose set forth.

5. In a machine for treating feathers, an endless belt or apron upon which the feathers are deposited, one or more pairs of rollers or cylinders to crush the feathers carried forward by said belt, a receptacle or chamber located above said crushing-rollers, a blower to free the feathers from dust and force them into said chamber or receptacle, combined with an endless belt to receive the feathers from the crushing-rollers, a revolving drum or cylinder having teeth, a stationary shell or drum located above the said revolving drum or cylinder and provided with teeth to co-operate with the teeth of the said revolving cylinder, and with means, substantially as described, to operate the parts of the apparatus, as and for the purpose set forth.

In testimony whereof I have signed my name to this specification in the presence of two subscribing witnesses.

ARTHUR C. RICH.

Witnesses:
EUGENE D. LACOUNT,
LEANDER O. HODGDON.